US007007365B2

(12) United States Patent
Vanderburg

(10) Patent No.: US 7,007,365 B2
(45) Date of Patent: Mar. 7, 2006

(54) SLIDING PANEL PHOTOGRAPHIC CARD

(76) Inventor: Mark Vanderburg, 16584 Creekside Rd., Riverside, CA (US) 92503

(*) Notice: Subject to any disclaimer, the term of this patent is extended or adjusted under 35 U.S.C. 154(b) by 0 days.

(21) Appl. No.: 10/046,833

(22) Filed: Jan. 15, 2002

(65) Prior Publication Data

US 2002/0095835 A1 Jul. 25, 2002

Related U.S. Application Data

(60) Provisional application No. 60/263,466, filed on Jan. 23, 2001.

(51) Int. Cl.
*B23P 11/00* (2006.01)

(52) U.S. Cl. .................. 29/434; 40/124.01; 40/124.17; 40/491; 40/513; 40/509

(58) Field of Classification Search ............. 40/124.01, 40/124.17, 446, 491, 513, 488, 508, 509; 446/151; 29/434
See application file for complete search history.

(56) References Cited

U.S. PATENT DOCUMENTS

| | | | | | |
|---|---|---|---|---|---|
| 718,305 | A | * | 1/1903 | Blanchard | 40/488 |
| 1,658,968 | A | * | 2/1928 | Carroll | 40/488 |
| 2,485,806 | A | * | 10/1949 | Berg | 40/488 |
| 2,961,788 | A | * | 11/1960 | Halperin | 40/446 |
| 3,659,367 | A | * | 5/1972 | Yumoto | 40/491 |
| 4,809,453 | A | * | 3/1989 | Morgan | 40/488 |

* cited by examiner

*Primary Examiner*—Gary Hoge
(74) *Attorney, Agent, or Firm*—Rutan & Tucker, LLP; Robert D. Fish

(57) ABSTRACT

A sliding panel display device for displaying two different images, such as photographs, comprises front and rear panels, each bearing a different image or photograph, and each divided into a plurality of parallel strips. The strips of the front panel are arranged as slidable interleaves between the strips of the rear panel, whereby the strips of the front panel are movable between a first position, in which the strips of the rear panel are completely covered by the strips of the front panel, and a second position, in which the strips of the front panel are completely hidden behind the strips of the rear panel whereby in the first position, only the image on the front panel is visible, while in the second position, only the image on the rear panel is visible. These panels are held together in the interleaved relationship in a holder that forms a frame. The rear panel is fixed in the holder, while the front panel is held in the holder so as to be slidable between the first and second positions. The front panel includes a pull tab extending from its bottom edge, which may be grasped to move the front panel between the first and second positions. A method for printing the first and second images on pre-die cut first and second sheets with a computer controlled printer is also disclosed.

4 Claims, 6 Drawing Sheets

FIG. 7A
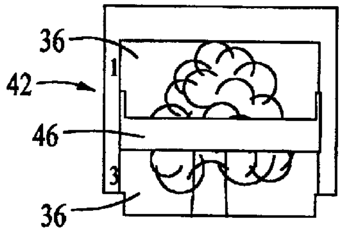
FIG. 7C
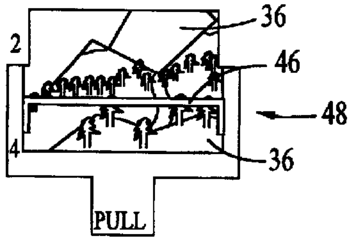
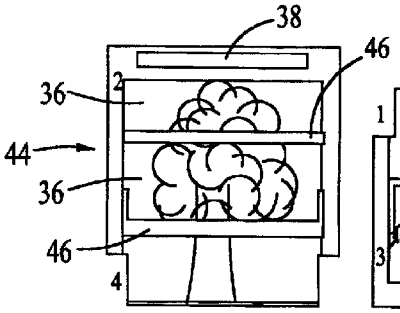
FIG. 7B
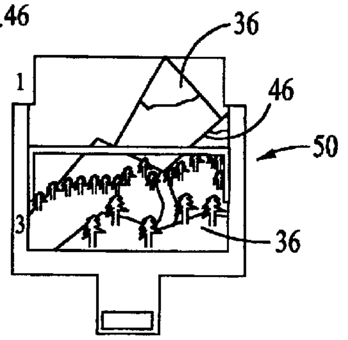
FIG. 7D
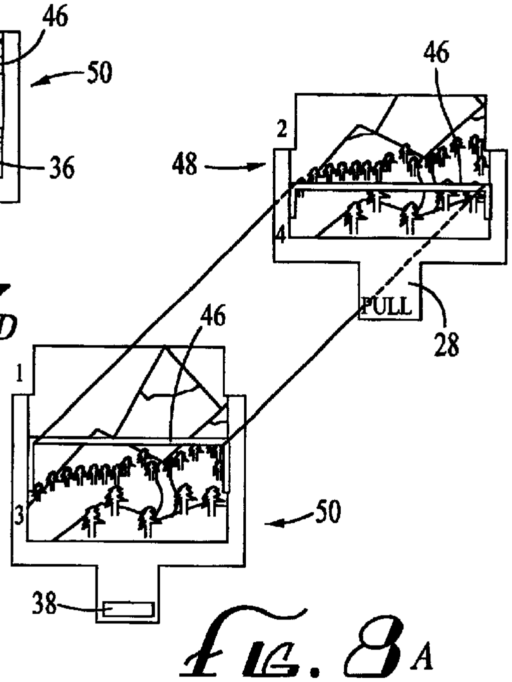
FIG. 8A
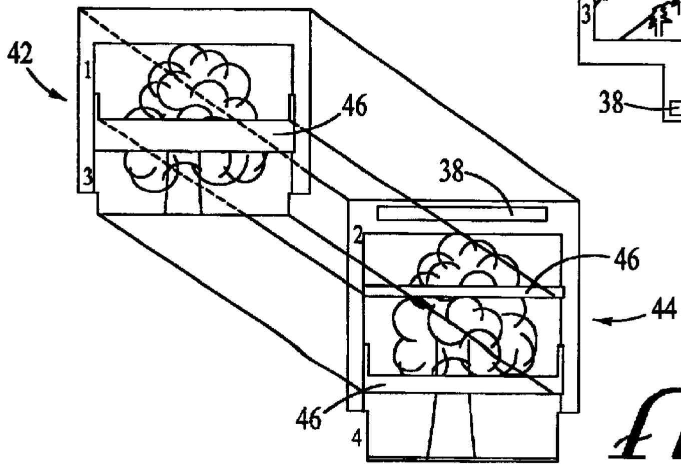
FIG. 9A FIG. 8B
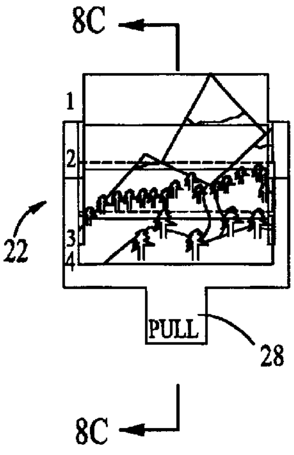
FIG. 9B
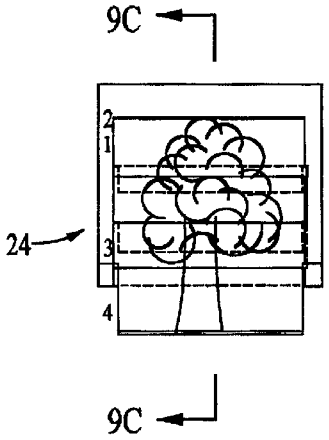
FIG. 10
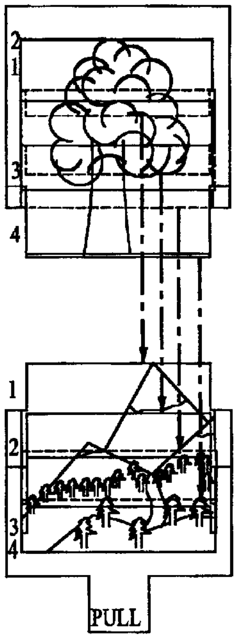
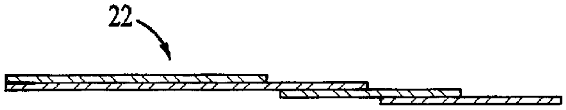
FIG. 8C
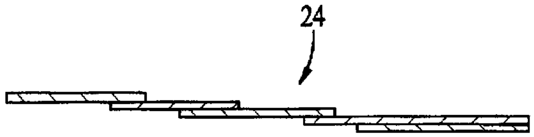
FIG. 9C
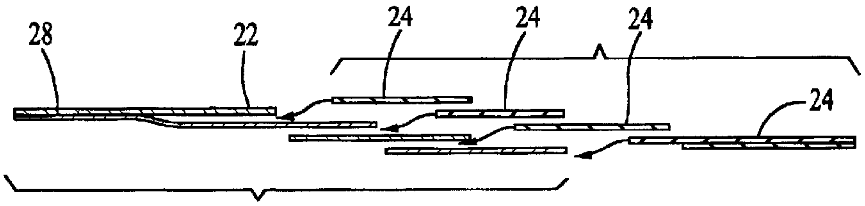
FIG. 11

SLIDING PANEL PHOTOGRAPHIC CARD

CROSS REFERENCE TO RELATED APPLICATION

The present non-provisional application claims the priority of provisional application Ser. No. 60/263,466, filed on Jan. 23, 2001.

FEDERALLY SPONSORED RESEARCH OR DEVELOPMENT

Not Applicable

BACKGROUND OF THE INVENTION

1. Field of the Invention

This invention relates to the field of devices for the display of graphic images, and particularly photographs. More specifically, it relates to a device in which two images or photographs are simultaneously held in a single holder in overlapping relationship and can be selectively displayed within a frame formed by the holder. The invention also relates to a die-perforated carrier from which the device is formed.

2. Brief Description of Prior Art

Display devices in the form of frames, some of which are normally hung on walls or like vertical surfaces, and others which are normally placed on horizontal surfaces to display images, such as pictures or photographs, are well known in the art. However, as far as the present inventor is aware, there is no display device in the prior art which can hold two different images in overlapping relationship with one image covering the other, and allow the display of one of the two images at the option of a user by simple pulling of a tab or the like. Moreover, as far as the present inventor is aware there is no method known in the prior art, which allows the computer controlled printing of the images on pre-die-cut sheets of paper and assembly of the printed sheets into the display device. The present invention provides this type of display device and a method of preparing of the same, which have hitherto been missing from the prior art.

SUMMARY OF THE INVENTION

Broadly, the present invention is a sliding panel photographic card comprising front and rear panels, each bearing a different image or photograph, and each divided into a plurality of parallel strips. The strips of the front panel are arranged as slidable interleaves between the strips of the rear panel, whereby the strips of the front panel are movable between a first position, in which the strips of the rear panel are completely covered by the strips of the front panel, and a second position, in which the strips of the front panel are completely hidden behind the strips of the rear panel. Thus, in the first position, only the image on the front panel is visible, while in the second position, only the image on the rear panel is visible.

The front and rear panels are held together in the interleaved relationship in a holder that forms a frame. The rear panel is fixed in the holder, while the front panel is held in the holder so as to be slidable between the first and second positions. The front panel includes a pull tab extending from its bottom edge, which may be grasped to move the front panel between the first and second positions.

The invention also resides in the method of making the above-described sliding panel photographic card. The method comprises the steps of (a) providing a first sheet of photographic quality (or like) printer paper die-perforated in first and second patterns corresponding to the front and rear panels, each divided into a plurality of parallel strips respectively; (b) providing a second sheet of paper or carton in a third pattern corresponding to the frame; (c) printing a first image onto the first pattern and a second image onto the second pattern; (d) removing the first and second patterns from the first sheet to form the first and second panels bearing strips forming the first and second images, respectively; (e) assembling the front and rear panels in overlapping relationship with the strips of the front panel interleaved between the strips of the rear panel; (f) removing the third pattern from the second sheet to form an unfolded holder/frame member; and (g) installing the assembled front and rear panels in the holder/frame member so that the rear panel is held in a front-to-back relationship with the front panel, and the front panel is slidable between a first position in which the strips of the rear panel are completely covered by the strips of the front panel thereby showing the first image, and a second position, in which the strips of the front panel are completely hidden behind the strips of the rear panel thereby showing the second image.

BRIEF DESCRIPTION OF THE DRAWING FIGURES

FIG. 7A is a plan view of a part of a rear panel after removal from the left side of the front sheet.

FIG. 7B is a plan view of another part of the rear panel after removal from the left side of the front sheet.

FIG. 7C is a part of a front panel after removal from the right side of the front sheet.

FIG. 7D is another part of a front panel after removal from the right side of the front sheet.

FIG. 8A shows the manner of interleaving the two parts of the front panel.

FIG. 8B is a plan view of the front panel interleaved from the two parts.

FIG. 8C is a cross-sectional view taken on lines 8C,8C of FIG. 8B.

FIG. 9A is a plan view showing the manner of interleaving the two parts of the rear panel.

FIG. 9B is a plan view of the rear panel interleaved from the two parts.

FIG. 9C is a cross-sectional view taken on lines 9C,9C of FIG. 9B.

FIG. 10 is a plan view showing the assembly of the front and rear panels.

FIG. 11 is a cross-sectional view taken on lines 11,11 of FIG. 10.

DESCRIPTION OF THE PREFERRED EMBODIMENT

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
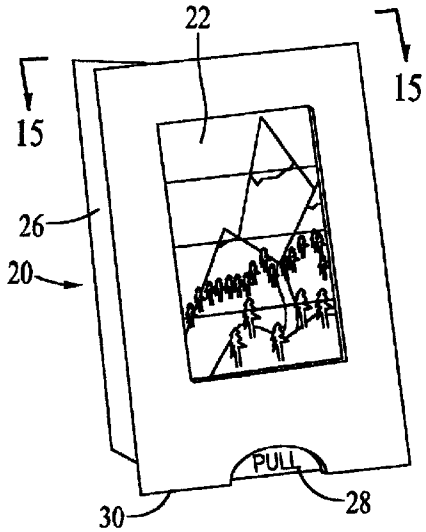
FIG. 1 is a perspective view of the photographic card of the present invention, the view showing a first panel displaying an image.
Figure 2:
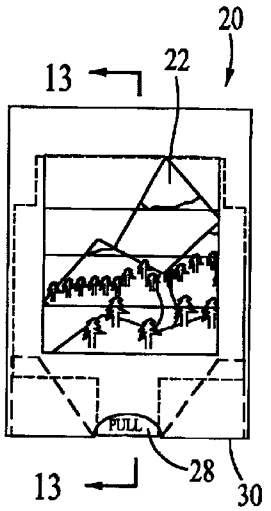
FIG. 2 is a plan view of the photographic card of the present invention, the view showing a first panel displaying an image.
Figure 3:
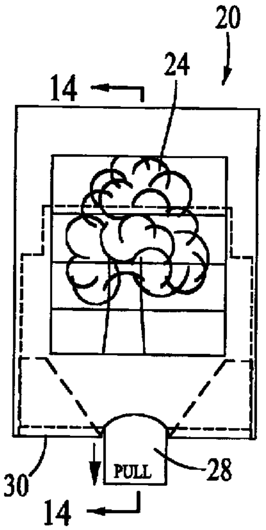
FIG. 3 is a plan view of the photographic card of the present invention, the view showing a second panel displaying a different image.
Figure 13:
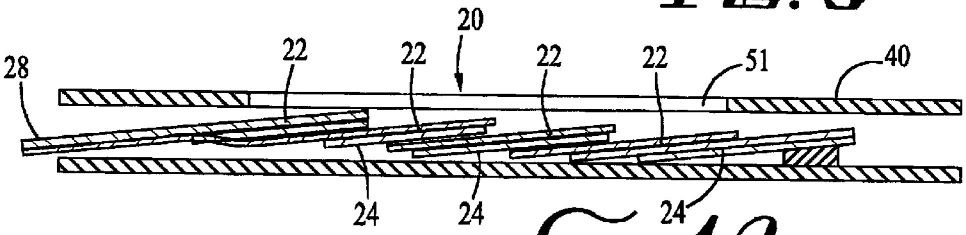
FIG. 13 is a cross sectional view taken on lines 13,13 of FIG. 2.
Figure 14:
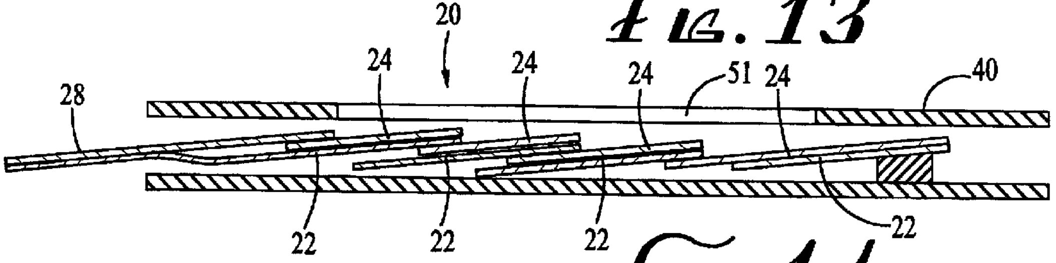
FIG. 14 is a cross sectional view taken on lines 14,14 of FIG. 3.
Figure 15:
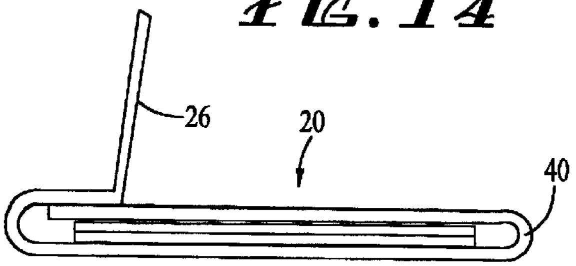
FIG. 15 is a cross sectional view taken on lines 15,15 of FIG. 1.

Referring now to the drawing figures and particularly to the perspective view of FIG. 1, photographic card or card assembly 20 of the present invention is disclosed. The photographic card or card assembly 20 comprises a first panel 22 that displays an image, which for the sake of precision in the description is hereinafter termed the first image. FIG. 2 of the appended drawings also shows the photographic card or card assembly 20, in plan view displaying the first image. The photographic card or card assembly 20 of the present invention also includes a second panel 24 that carries an image, which is hereinafter termed the second image. The views of FIGS. 1 and 2 show the card assembly 20 in a position or situation wherein the second panel 24 is disposed behind the first panel 22, and therefore the second image is hidden from view. FIG. 3 shows the card assembly 20 in a position or situation wherein the first panel 22 is disposed behind the second panel 24, and therefore the second image is displayed. The herein described preferred embodiment of the card assembly 20 includes an ear or easel flap 26, which may be folded out from the rear of the card assembly 20, and which may be used to support the card assembly 20 in an upright standing position on a support surface (not shown), such as a table (not shown). FIGS. 1 and 2 of the drawings disclose a tab 28 which in the preferred embodiment is essentially flush with the lower edge 30 of the card assembly when the first panel 22 displaying the first image is exposed for view. The tab 28 is pulled out, as shown in FIG. 3 when the second panel 24 displaying the second image is exposed for view. The tab 28 can also be folded to occupy a position substantially parallel with a support surface (not shown).

The images displayed in the first 22 and second 24 panels may be of varying nature, and are not limited within the scope of the invention. As such, the images may be pictures, photographs, or text, in essence any type of illustration or indicia. Moreover, the images may be placed on the first 22 and second panels 24 in any manner consistent with the ensuing description, for example they could be drawn, painted, silk-screened or deposited by any know technology for placing images on a flat surface. The preferred embodiment of the present invention is nevertheless designed primarily to display photographs or like images, which are likely to be deposited on the first 22 and second 24 panels by a printer (not shown) controlled by a computer (not shown), such as a personal computer (not shown) that utilizes one or more of the well known and commercially available picture and/or photograph printing programs. For the foregoing reasons the present invention is hereinafter described with emphasis on pictures, such as photographs, displayed on the first 22 and second panels 24 and deposited thereon by a printer (not shown) as directed by any of the well known image processing and printing computer programs widely available in the art.

It should already be readily apparent from the foregoing description to those skilled in the art that a principal feature of the present invention is that the card assembly 20 holds two pictures or images, and that either one of these can be displayed at the option of a user (not shown) simply by manipulating the tab 28. The ensuing description discloses the manner of constructing the card assembly 20 that accomplishes this result.

Figure 4:
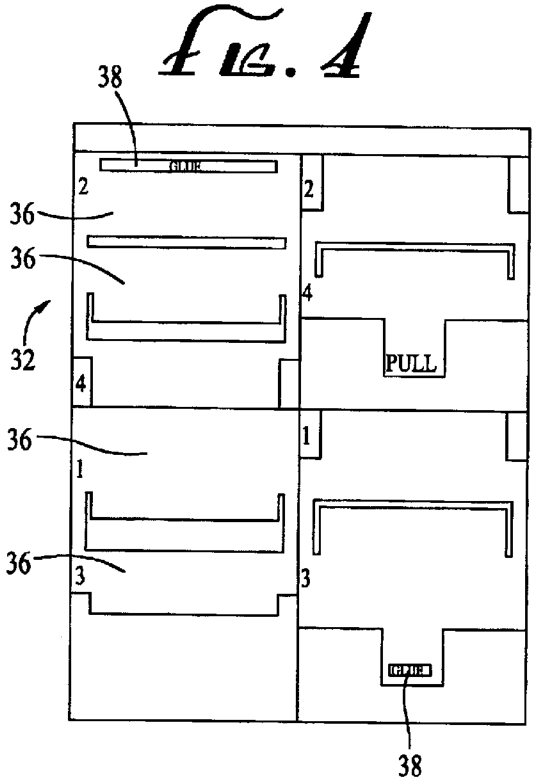
FIG. 4 is a plan view of a die-perforated first sheet before any image is printed thereon.

A die-perforated (or otherwise pre-cut) first sheet 32 is provided in accordance with the present invention, and is shown in FIG. 4. Preferably, and in accordance with the first preferred embodiment the first sheet 32 comprises photographic quality paper, more precisely the kind of photographic quality paper on which it is customary to print photographs under the control of a computer (not shown) with the assistance of an image printing program. The first sheet 32 is die-cut in such a manner that a picture or image can be printed onto its right side in 4 strips or sections, and another picture or image can be printed, also in 4 strips or sections on its left side. The picture or image printed on the right side of the sheet 32 corresponds to the first image carried by the first panel 22 in the assembled card 20, and the picture or image printed on the left side of the sheet corresponds to the second picture or image carried by the second panel 24. FIG. 4 discloses the first sheet 32 before pictures or images are printed thereon.

The printing of the images or photographs on the first sheet is performed by printing each image in 4 parts on the left and right sides of the underlying sheet, respectively, which after separation of the die-cut lines, become strips 36 to be assembled into the respective panels 22 and 24. Glue carrying areas 38 are provided on the first sheet 32 in the areas shown in FIGS. 4 and 6. Alternatively, the areas 38 may just be marked for external glue (not shown) to be deposited thereon by a user (not shown). The printing of the pictures desired to be displayed in the card assembly 20 of the present invention (the first picture on the right side of the sheet 32, and the second on the left side) is done by the software-program-controlled printer in accordance with the parameters provided for the first preferred embodiment, wherein the sheet 32 is of the American standard 8.5 by 11 inches in size. These parameters are expressed in inches, as indicated in FIG. 16 and counted, as applicable or indicated from the respective edges 39 of the sheet 32.

Figure 16:
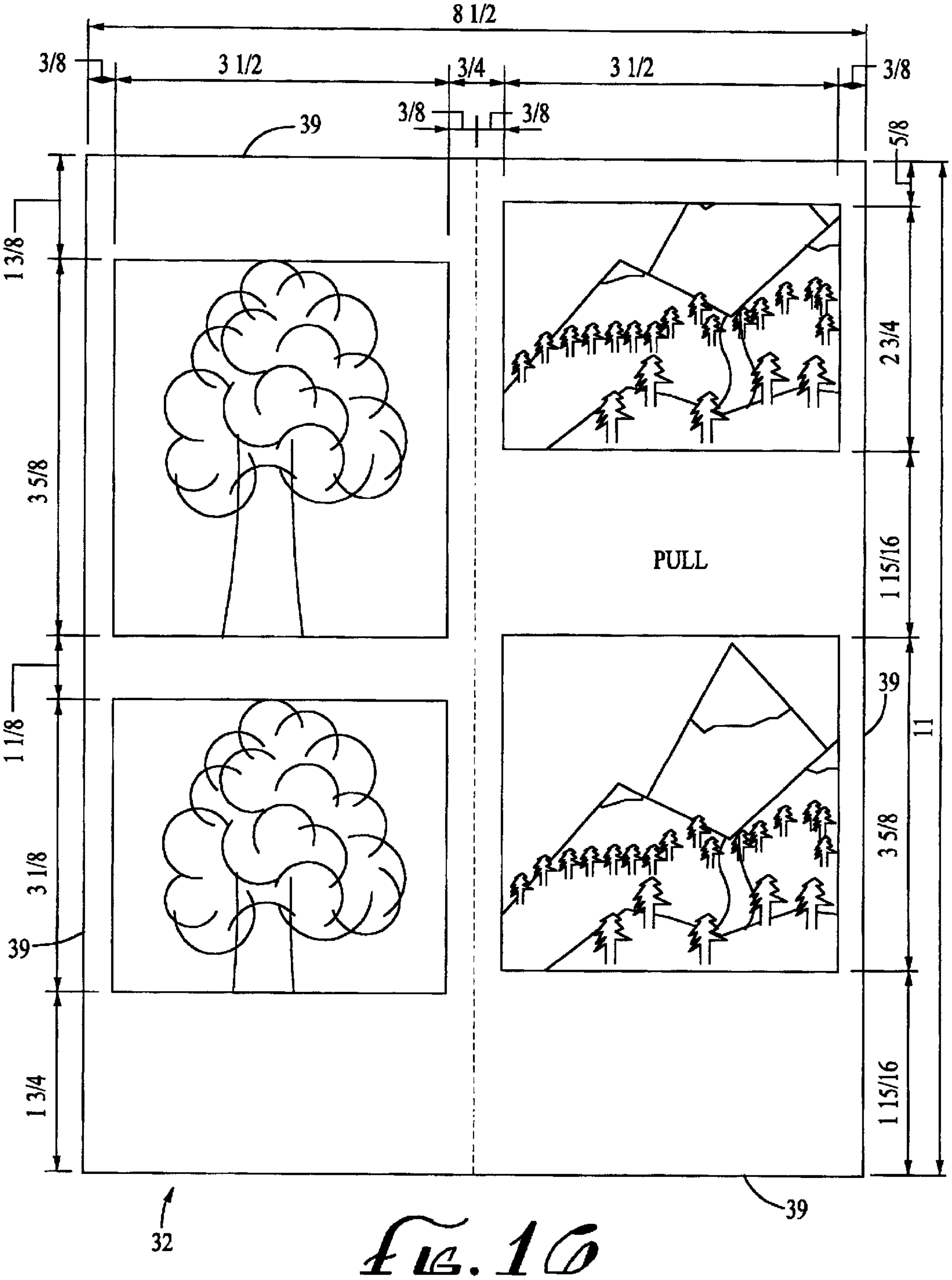
FIG. 16 is a plan view of the first sheet of the invention showing the precise areas where images are printed on the first sheet in the preferred embodiment.

It should be understood that printing pictures or other indicia on the first sheet 32 with a printer (not shown) controlled by a personal computer (not shown) having an image processing program, into the spaces defined by the parameters show on FIG. 16 is a task that can be performed by a person skilled in working with state-of-the-art picture processing programs. It should also be understood that different values for these parameters can be designed within the scope of the invention and in light of the present disclosure.

Figure 6:
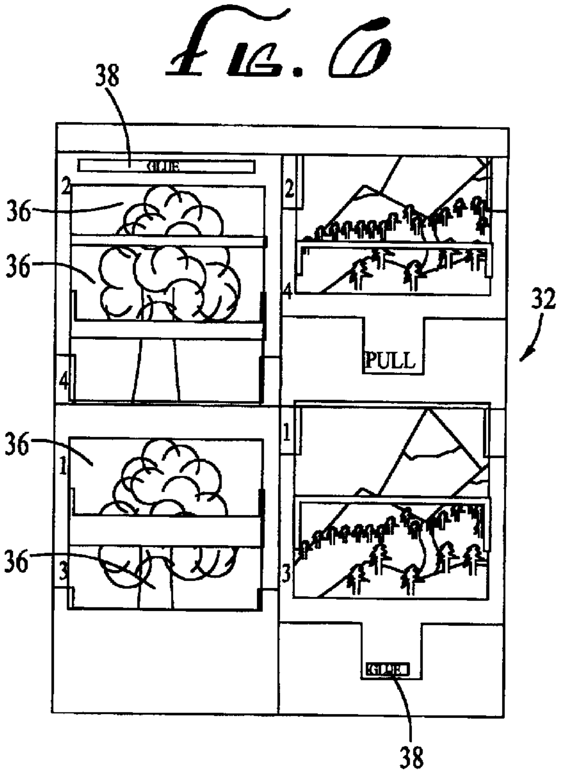
FIG. 6 is a plan view of the die-perforated first sheet after first and second images are printed thereon.

FIG. 6 illustrates the first sheet 32 of the invention, after both the first and second images or photographs have been printed thereon, in the above-described manner.

Figure 5A:
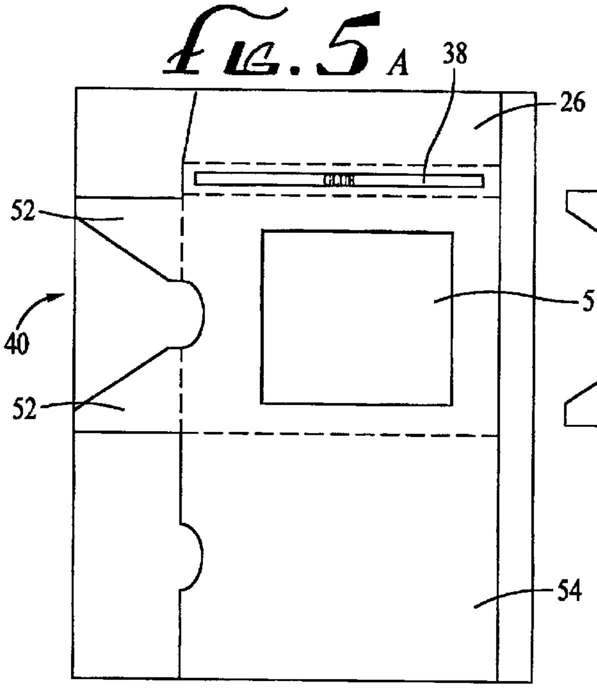
FIG. 5A is a plan view of a die-perforated second sheet before removal of any excess material.
Figure 5B:
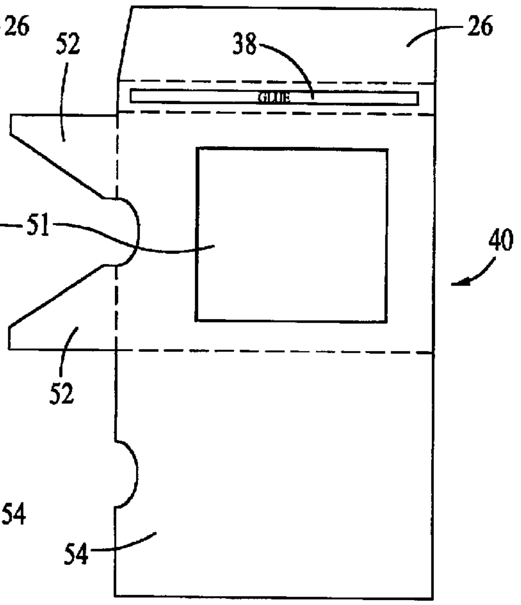
FIG. 5B is a plan view of the die-perforated second sheet after removal of excess material.

A second sheet 40, is provided in accordance with the present invention, and is illustrated in FIG. 5A. No image is printed or otherwise deposited on the second sheet 40. Rather, the second sheet 40 serves to form a frame and support onto which the image carrying first 22 and second 24 panels are assembled. The preferred embodiment of the second sheet 40 is also of the "standard" 8.5 by 11 inches in size, and although it does not receive a printed image it can also be photographic quality paper, or paper or carton of sufficient rigidity that it can serve for receiving the mounted panels 22 and 24 and to support them in an up-right position standing on a support surface (not shown). The second sheet 40 also contains perforations or die cutting, to delimit areas or parts which are to be removed and not used for preparing the card assembly 20. FIG. 5B illustrates the second sheet 40 after the unnecessary or excess material has been removed from it.

FIGS. 7A and 7B illustrate two parts, that is two pieces 42 and 44, respectively of photographic paper which are obtained from the left side of the first sheet 32, by separating the first sheet 32 into the pieces 42 and 44 along the die-cut or pre-perforated lines. It can be seen that the second image has been printed into the two pieces 42 and 44 in 4 strips 36, and that each piece includes slotted areas or slots 46. Similarly, FIGS. 7C and 7D illustrate two parts, that is two pieces 48 and 50, respectively of photographic paper which are obtained from the right side of the first sheet 32, by separating the first sheet 32 into the pieces 48 and 50 along the die-cut or pre-perforated lines. It can be seen that the first image has been printed into the two pieces 48 and 50 in 4 strips 36, and that each piece includes slotted areas or slots 46. The numerals 1, 2, 3, and 4, respectively printed on the edge of the pieces 42, 44, 48 and 50, as applicable, refer to the segment or portion of the image which is printed on the respective strip 36, and facilitates the process of printing and assembling.

FIG. 8A shows how the two pieces 48 and 50 are assembled to one another by placing the tab 28 of piece 50 into the slot 46 of the piece 48, and gluing the glued area to the paper above it. FIG. 8B illustrates the first panel 22 assembled or interleaved from the two pieces 48 and 50. Similarly, FIG. 9A shows how the two pieces 42 and 44 are assembled to one another by insertion and gluing of the glue carrying areas 38, and FIG. 9B illustrates the second panel assembled or interleaved from the two pieces 42 and 44. FIGS. 8C and 9C show the assembled or interleaved first 22 and second 24 panels in cross-section, respectively.

FIGS. 10 and 11 illustrate how the first panel 22 bearing the first image is assembled or interleaved to the second panel 24 bearing the second image. This is done so that the panels 24 are disposed in the positions shown in FIG. 11.

Then the two panels 22 and 24 are slid together completely. FIG. 11 illustrates the interleaved first 22 and second 24 panels in cross section, and shows their relationship.

Figures 12A, 12B, 12C, 12D:
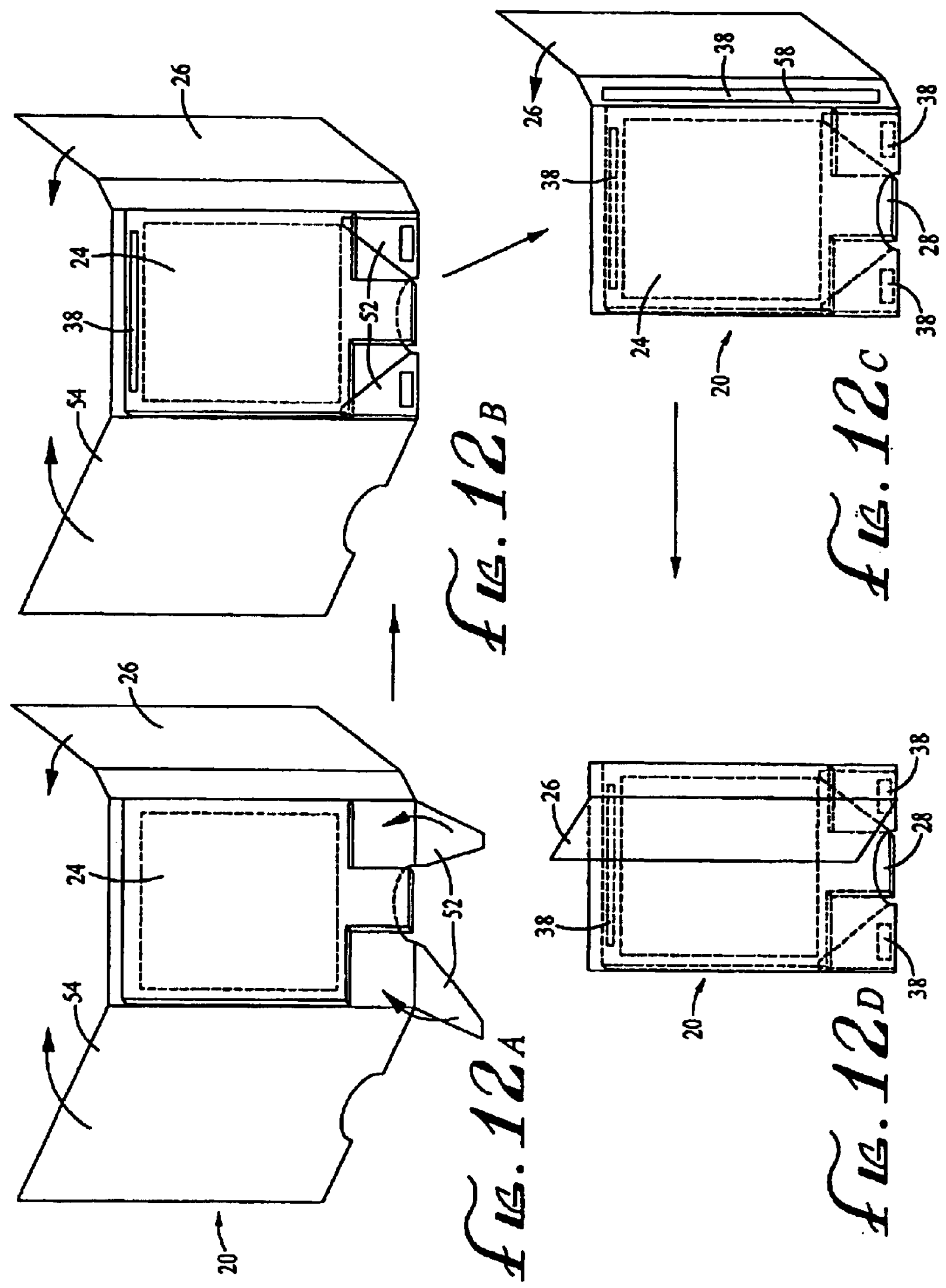
FIGS. 12A–12D are rear perspective views, respectively showing the steps of assembling the front and rear panels and the second sheet from which excess material has been removed, to form the photographic card of the present invention.

FIG. 12A through 12D illustrate the steps of forming the card assembly 20 from the assembled or interleaved first 22 and second 24 panels, illustrated in FIGS. 10 and 11, and from the second sheet 40, from which the excess material has been removed, illustrated in FIG. 5B. Thus, referring now to FIGS. 12A through 12D which illustrate the process from a rear view, the assembled panels 22 and 24 are placed into the open window 51, with the image bearing side facing forwards, centered and with the top of the assembled panels 22 and 24 flush with the top of the second sheet 40. This is shown in FIG. 12A. In subsequent steps flaps 52 of the second sheet are folded up over and on top of the assembled panels 22 and 24. Some glue (not shown) is applied to the flaps 52 and to the top of the back side of the assembled panels 22 and 24. Then the large flap or back cover 54 is folded over the flaps 52. During this operation care must be taken not to remove the assembled panels 22 and 24 from their correct positions. Glue (not shown) is then applied to an elongated gluing area 38 forming a narrow strip 58, shown in FIG. 12C, which is thereafter folded back and glued to the back cover 54. In order to place the card assembly 20 on a support surface(not shown) the easel flap 26 is folded out to support the assembly 20.

As it was noted at the outset, the card assembly 20 of the present invention displays one of the two images or photos at the option of a user (not shown). When the tab 28 is in the in position, as shown in FIGS. 1 and 2, then the first image of the first panel 22 is shown. The image of the second panel 24 is hidden from view because the 4 strips 36 forming the first picture cover the four strips 36 forming the second picture. In order to reverse the situation and display the second image of the second or rear panel 24, a user (not shown) merely needs to pull on the tab 28 causing the strips 36 of the first panel 20 to slide downward and behind the strips 36 of the second panel 24 thereby revealing the picture of the second panel 24.

What is claimed is:

1. A method of making a sliding panel display device which comprises:

front and rear panels, each bearing a different image, and each panel being divided into a plurality of parallel strips;

the strips of the front panel being arranged as slidable interleaves between the strips of the rear panel, whereby the strips of the front panel are movable between a first position, in which the strips of the rear panel are completely covered by the strips of the front panel, and a second position, in which the strips of the front panel are completely hidden behind the strips of the rear panel and whereby in the first position, only the image on the front panel is visible and whereby in the second position, only the image on the rear panel is visible, and a holder forming a frame and holding said front and rear panels together in the interleaved relationship, the rear panel being fixed in the holder, and the front panel being held in the holder so as to be slidable between the first and second positions, the method comprising the steps of:

(a) providing a first sheet of a printable surface perforated in first and second patterns corresponding to the front and rear panels, each divided into a plurality of parallel strips respectively;

(b) providing a second sheet in a third pattern corresponding to the holder;

(c) printing a first image onto the first pattern and a second image onto the second pattern;

(d) removing the first and second patterns from the first sheet to form the first and second panels bearing strips forming the first and second images, respectively;

(e) assembling the front and rear panels in overlapping relationship with the strips of the front panel interleaved between the strips of the rear panel;

(f) removing the third pattern from the second sheet to form an unfolded holder; and (g) installing the assembled front and rear panels in the holder so that the rear panel is held in a front-to-back relationship with the front panel, and the front panel is slidable between a first position in which the strips of the rear panel are completely covered by the strips of the front panel thereby showing the first image, and a second position, in which the strips of the front panel are completely hidden behind the strips of the rear panel thereby showing the second image.

2. A method in accordance with claim 1 wherein the steps of printing the first and second images comprises printing of pictures.

3. A method in accordance with claim 1 wherein the steps of printing the first and second images comprises printing with a printer controlled by a computer.

4. A method in accordance with claim 1 wherein each panel comprises photographic quality paper suitable to accept printing of images by a computer-controlled printer.

* * * * *